United States Patent [19]

Yarwood

[11] 4,378,996
[45] Apr. 5, 1983

[54] METHOD FOR PREPARING BINDER FOR REFRACTORY POWDERS

[75] Inventor: Dennis Yarwood, Wrexham, England

[73] Assignee: Clino Foundry Supplies Limited, England

[21] Appl. No.: 269,944

[22] Filed: Jun. 3, 1981

[30] Foreign Application Priority Data

Jun. 4, 1980 [GB] United Kingdom ................ 8018233

[51] Int. Cl.$^3$ .............................................. B28B 7/34
[52] U.S. Cl. ................................ 106/38.35; 106/38.3; 106/287.16; 106/287.34
[58] Field of Search ............... 106/38.35, 287.16, 38.3, 106/287.34

[56] References Cited

U.S. PATENT DOCUMENTS

| | | | |
|---|---|---|---|
| 2,842,445 | 7/1958 | Emblem et al. | 106/38.35 |
| 3,961,968 | 6/1976 | Wales | 106/38.35 |
| 4,289,803 | 9/1981 | Wales et al. | 106/38.35 |

FOREIGN PATENT DOCUMENTS 1309915  3/1973  United Kingdom .

Primary Examiner—Lorenzo B. Hayes
Attorney, Agent, or Firm—Christensen, O'Connor, Johnson & Kindness

[57] ABSTRACT

A method for preparing a hybrid binding liquid comprises coloidal silica derived from the hydrolysis of an alkyl silicate and from an acidic organo-aqueous silica sol. More than 50% by weight of silica is derived from the sol by the expedient of replacing part of the water in a commercially available silica sol either by a polyhydric alcohol or by silica.

7 Claims, No Drawings

METHOD FOR PREPARING BINDER FOR REFRACTORY POWDERS

DESCRIPTION

This invention relates to a binding liquid for refractory powders and other purposes which comprises colloidal silica derived from two sources:
 (a) The hydrolysis of an alkyl silicate, and
 (b) From an acidic organo-aqueous sol.

Such hybrid binding liquids are contemplated in U.S. Pat. No. 2,842,445 and British Pat. No. 1,309,915.

The invention will principally be described with reference to the hydrolysis of ethyl silicate though other alkyl silicates specifically methyl, n-propyl and isopropyl silicates could be used.

According to the present invention such a binding liquid has at least 50% (weight) of the silica derived from source (b) set out above. Up to the present time it has been thought possible only to include in a stable binding liquid a maximum of 44% of silica derived from the sol with a total silica content of 25%. Silica from the sol is less expensive than silica derived by hydrolysis and accordingly there is economic advantage in optimising the percentage of silica derived from source (b).

Methods in accordance with the present invention for achieving this higher level of silica derivation from the sol are basically characterised by reducing the amount of water in the commercially available silica sol which constitutes source (b). Two principal means for achieving this are envisaged. Firstly the silica content can be raised by a simple dewatering procedure such as distillation under reduced pressure. Thus the typical 40–50% by weight silica in a commercially obtainable sol is raised to 60% or greater. In another proposed method in accordance with the present invention the water is replaced by a polyhydric alcohol such as ethylene glycol or 2-ethoxyethanol.

The binding liquid additionally contains a mutual solvent for water and alkyl silicate such as ethyl or isopropyl alcohol, an acid such as sulphuric acid to stabilise the sol during the alcohol addition and to catalyse the hydrolysis of the alkyl silicate, and water for the hydrolysis. The relative proportions of the formulation will be so calculated that the residual water in the sol and the added water will be just sufficient to effect the hydrolysis of the alkyl silicate.

The amount of acid present will be typically between 0.05 to 0.15 by weight of sulphuric acid in the system. There has to be sufficient acid to stabilise and catalyse the hydrolysis but excessive acid reduces the shelf life of the hydrolysate.

In a typical method of the invention the aqueous system of acidified dewatered sol is mixed with the mutual solvent and then mixed with tetraethoxysilane (TEOS) in monomeric form. Hydrolysis of the TEOS to silicic acid takes place and the hybrid binder containing colloidal silica is ready for use. Excess of water in the binder is detrimental. 2 moles of water are sufficient to hydrolyse 1 mole of TEOS. The quantity of TEOS in the commerically available alcohol solution is known, typically 29%, and the acid requirement is of the order of 0.05% by weight of the binder. Thus quantities of reagents required to achieve a desired total silica content in the binder and the respective contributions from the sol and the ethyl silicate can be calculated.

The following are examples of suitable formulations to be prepared as set out above.

EXAMPLES

| Total % by weight silica in Binder | 18% (1) $SiO_2$ | 20% (2) $SiO_2$ | 28% (3) $SiO_2$ | 34% (4) $SiO_2$ |
| --- | --- | --- | --- | --- |
| 60% silica sol (32% water 8% ethylene glycol) | 150 kg | 166 kg | 233 kg | 283 kg |
| Water | 6 kg | 8 kg | 11 kg | 13 kg |
| Isopropyl alcohol (mutual solvent) | 523 kg | 469 kg | 256 kg | 97 kg |
| $H_2SO_4$ (98%) | 1000 mls | 1000 mls | 1000–2000 mls | 1000–2000 mls |
| TEOS (monomeric tetraalkyl ortho silicate) containing 28% silica) | 321 kg | 357 kg | 500 kg | 607 kg |

In all cases after hydrolysis silica is contributed.
 (a) 50% from the 60% silica sol
 (b) 50% from TEOS Up to 40% $SiO_2$ (silica) can be achieved but at such high concentrations stability is enhanced if the ethyl silicate is not completely hydrolysed.

It will be appreciated that these contributions are calculated in advance.

By adding quantities of a polyhydric alcohol such as ethylene glycol or 2-ethoxyethanol to the 40–50% commerically available sol (which already contains ethylene glycol) prior to concentration by removal of water, larger contributions of silica from the sol can be achieved in the hybrid binder. A sol thus pretreated by the addition of 10% by weight ethylene glycol has the following dewatered composition:

| % $SiO_2$ w/w | 55.550 |
| --- | --- |
| % Glycol w/w | 22.225 |
| % Water w/w | 22.225 |

It will be appreciated that the water is largely replaced by the ethylene glycol. Using these ethylene glycol addition techniques to the virtual removal of water polymerized ethyl silicate can be used as the material to be hydrolysed.

A binding solution based on the monomer TEOS can be prepared using the ethylene glycol pretreatment outlined above with silica distribution as follows:
 (1) 62% from sol
 (2) 38% from TEOS By increasing the glycol and reducing the water content of the sol up to 75% silica can be derived from the sol with 25% from the TEOS.

In all the solutions described above the TEOS is totally hydrolysed in the binder and the resulting solution contains substantially no free water. The solutions offer economies and greatly improved stability over other known hybrid formulations.

The hybrid binders in accordance with the invention are useful, inter alia, for binding refractory powders in which event a slurry is prepared of the binder and refractory powder. The binders may also be used for paints and other surface coatings. The folllowing table sets out gellation characteristics of the 20% $SiO_2$ binding liquid of the Examples:

| Composition of gelation accelerator by volume | Gel Time | Gel Characteristics |
| --- | --- | --- |
| Acetate:Aqueous ethanol 1:5 | 5 min. | Coherent gel suitable for binding refractories. |
| Acetate | 15 sec. | Coherent gel suitable for binding refractories. |
| Acetate:Water 1:10 | 4 min. | Heterogenous gel unsatisfactory as binder |
| Acetate:Aqueous ethanol 1:20 | 13 min. | Coherent gel suitable for binding refractories. |
| Acetate:Water: Aqueous ethanol 1:5:5 | 3 min. | Coherent gel suitable for binding refractories. |

The aqueous ethanol has a specific gravity of 0.85. The acetate is the strong ammonium acetate solution described in The Pharmaceutical Codex, 11th Edn., p 34. (The Pharmaceutical Press, 1979, London.). All of the tests use 5 volumes of binder and 1 volume of gelation accelerator.

I claim:

1. A method of preparing a binding liquid comprising the steps of:
   mixing an aqueous acidified silica sol having a silica content of at least 60% with an unhydrolysed alkyl silicate and a mutual solvent for water and the alkyl silicate, the sol containing water in a substantially stoichiometric amount sufficient to hydrolyse the alkyl silicate, thereby providing a binding liquid substantially free of water and with at least 50% by weight of the total silicate present being derived from the sol.

2. The method of claim 1 further comprising:
   a premixing step of replacing part of the water in the sol by silica or a polyhydric alcohol.

3. The method of claim 2 characterized by a preliminary dewatering of the sol to raise the concentration of silica.

4. The method of claim 2 characterized by a preliminary addition of a polyhydric alcohol.

5. The method of claim 2, 3, or 4 characterized by the addition of 0.5 to 1.0% by weight of acid to acidify the sol.

6. The method of claim 2 to wherein the alkyl silicate is a monomeric tetraalkyl-ortho-silicate.

7. The method of claim 2 wherein the mutual solvent is ethyl alcohol or isopropyl alcohol.

* * * * *